United States Patent [19]

Nijman et al.

[11] 4,415,775

[45] Nov. 15, 1983

[54] ARRANGEMENT FOR EXCHANGING SIGNALS BETWEEN SEPARATED CIRCUITS

[75] Inventors: Aloysius J. Nijman; Franciscus A. C. M. Schoofs, both of Eindhoven, Netherlands

[73] Assignee: U.S. Philips Corporation, New York, N.Y.

[21] Appl. No.: 295,945

[22] Filed: Aug. 24, 1981

[30] Foreign Application Priority Data

Sep. 2, 1980 [NL] Netherlands .................... 8004970

[51] Int. Cl.³ .......................... H04B 3/02; H04B 3/30
[52] U.S. Cl. ................................. 179/78 R; 179/174; 179/2 C; 333/12; 307/90; 307/327
[58] Field of Search .................... 179/78 R, 78 A, 174, 179/170 NC, 79, 80, 16 A, 1 C, 1 P, 18 GF, 18 GE, 18 FA, 27 G, 70, 77; 333/12; 307/89, 90, 1, 2, 3, 4, 51, 327; 370/6

Primary Examiner—Stafford D. Schreyer

Attorney, Agent, or Firm—Thomas A. Briody; William J. Streeter; Edward W. Goodman

[57] ABSTRACT

Arrangement for transmitting at least two signals from a first circuit arrangement to a separate second circuit arrangement. In order to realize a disturbance-independent signal transmission with a small number of signal conductors, one signal conductor which includes an impedance having a high impedance value is provided between each of the signal sources of the first circuit arrangement and a separate signal sink of the second circuit arrangement. In addition, a signal conductor which includes an impedance having a high impedance value is provided between the ground of the first circuit arrangement and a separate signal sink of the second circuit arrangement. The second circuit arrangement comprises means for linearily combining the currents flowing in the signal conductors, for generating signal currents which are proportional to the transmitted signals.

5 Claims, 8 Drawing Figures

ARRANGEMENT FOR EXCHANGING SIGNALS BETWEEN SEPARATED CIRCUITS

The invention relates to an arrangement for transmitting signals from a first circuit arrangement comprising a first voltage reference point and a plurality of signal sources each having one side connected to the first voltage reference point to a second circuit arrangement comprising a second voltage reference point and a plurality of signal sinks each having one side connected to the second voltage reference point. The two voltage reference points are separated by an impedance having a value different from zero, it being possible that a disturbing voltage may be present between the two voltage reference points.

BACKGROUND OF THE INVENTION

Owing to external interference, disturbing voltages may be induced between circuits which are separated by means of an impedance. Examples of such separated circuits are the electronic control circuits in telephone exchanges on the one hand and the electronic circuits which are directly connected to the telephone lines on the other hand. The conductors of these lines may have a high common-mode voltage with respect to the central battery of the telephone exchange due to inductive interference by high-voltage power circuits or due to lighting, this interference acting in the longitudinal direction in these conductors. Disturbing voltages may also be formed by common-mode speech signals in the telephone circuits or by common-mode charging signals on the subscriber's lines.

Generally, it is a requirement that the voltages between the voltage reference points of the separated circuits do not affect the transmission of signals from one circuit to the other.

It is known to use transformers or other types of galvanically separated signal transmission such as, for example, optoelectric coupling devices, for the signal transmission. Such solutions are expensive or are only linear in a limited amplitude range.

OBJECT OF THE INVENTION

The invention has for its object to provide a linear transmission of signals between separated circuits over a wide amplitude range which is not affected by the disturbing voltages which may be present between the voltage reference points of the circuits, which object can be realised with simple means and requires only a small number of conductors.

SUMMARY OF THE INVENTION

The arrangement according to the invention is therefor characterized in that for the transmission of each one of the signals of the plurality of signal sources from the first to the second circuit arrangement one separate signal conductor which includes an impedance having a high impedance value, denoted high ohmic signal conductor, is provided between the relevant signal source of the first circuit arrangement and a separate signal sink of the second circuit arrangement, in that at least two of these high ohmic signal conductors are provided for the transmission of at least two independent signals and that a signal conductor which includes an impedance having a high impedance value, denoted high ohmic reference-signal conductor is provided between the first voltage reference point of the first circuit arrangement and a separate signal sink of the second circuit arrangement and that the second circuit arrangement includes means for linearly combining the currents flowing in the high ohmic signal conductors and the high ohmic reference-signal conductor for generating signal currents in the second circuit arrangement which are proportional to the signals transmitted by the first circuit arrangement to the second circuit arrangement and are substantially independent of the disturbing voltage which may be present between the voltage reference points of the two circuit arrangements.

It should be noted that the high ohmic impedances may be in the form of resistors, when DC transmission is required. For AC-transmission only capacitors may alternatively be used. It can be seen that in the case where there is a direct voltage between the voltage reference points and where the high ohmic impedances are in the form of resistors, the dissipation in these resistors will be comparatively low.

The characteristic of a signal transmission path comprising the said signal conductor is determined substantially wholly by the high ohmic impedance, so that accurately operating hybrid circuits which are balanced by high ohmic impedances may be provided at both ends of the signal conductors to realise duplex transmission.

BRIEF DESCRIPTION OF THE DRAWING

Embodiments of the invention will now be further described by way of example with reference to the accompanying Figures in which.

DETAILED DESCRIPTION OF THE PREFERRED EMBODIMENTS

Figure 1:
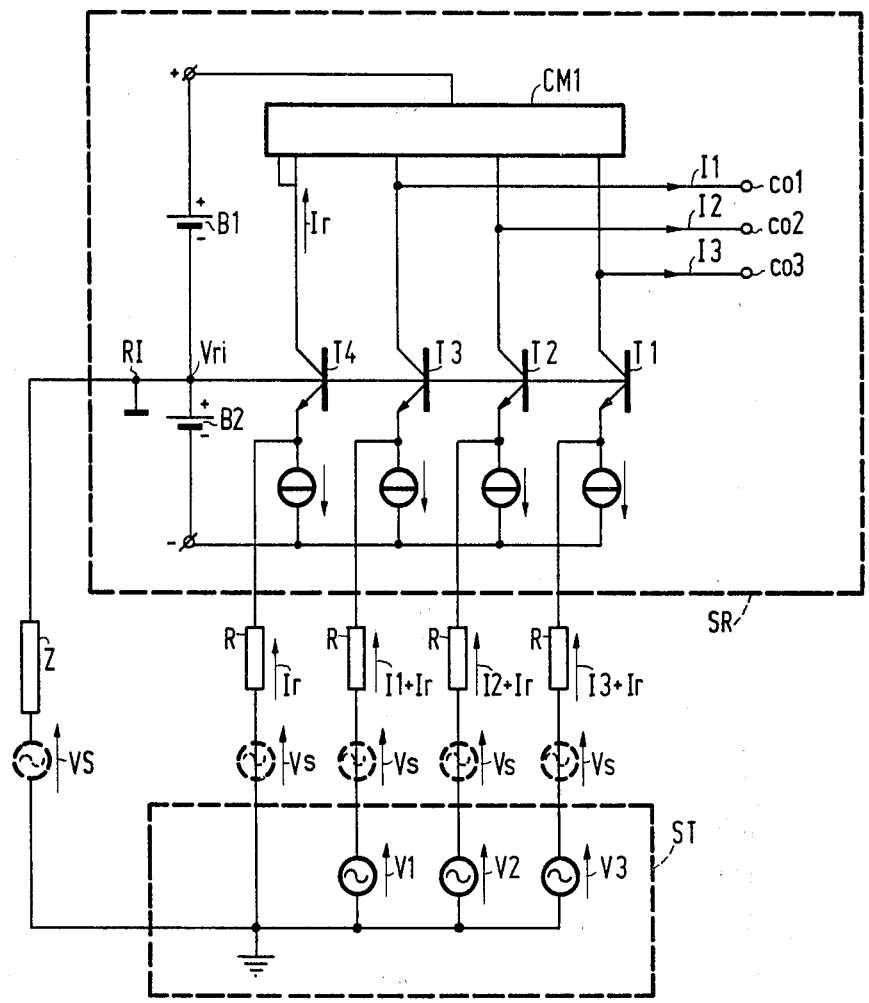
FIG. 1 shows an example of an arrangement according to the invention.

In FIG. 1 and the subsequent Figures ST denotes a grounded signal-transmitting first circuit arrangement and SR denotes a signal-receiving second circuit arrangement. Without prejudice to the universality of the present invention, the case may be considered by way of illustration in which the circuit SR forms part of a line circuit, a what is commonly referred to as SLIC-circuit or BORSCHT-circuit, of an automatic telephone exchange and in which the circuit ST forms part of the speech channel network or the control of the automatic telephone exchange.

The circuit ST comprises a plurality of independent signal sources producing signal voltages having the voltage values V1, V2 and V3. One side of each of these signal sources is connected to ground. For the case of an automatic telephone exchange this may be the earthing point of the central battery. This earthing point forms the reference point for the signal voltages V1, V2 and V3 and will be alternatively denoted (first) voltage reference point.

The circuit SR comprises a number of signal sinks which exceeds the number of signal sources of the circuit ST by one. These signal sinks are formed by the emitter-base junctions of the transistors T1, T2, T3 and T4. The bases of these transistors are interconnected and connected to a tap of a DC-supply source consisting of the series arrangement of two batteries B1 and B2. The voltages at the point denoted by RI and connected to the said tap constitutes a reference for the signals received from the circuit ST and this point will be denoted the second voltage reference point RI. The potential of this point will in general deviate from the earth potential of the circuit ST. The voltage at the second voltage reference point with respect to ground will be denoted by Vri.

With respect to ground, the second voltage reference point RI has an impedance having an impedance value Z which is not equal to zero. This impedance is the common-mode impedance of the circuit SR with respect to ground. The value Z may be infinitely large in which case the circuit SR floats with respect to earth. It will be assumed that Z is finite and differs from zero.

A signal conductor which includes a resistor having a high resistance value R in the order of magnitude of 100 kOhms is connected between the other side of each signal source V1, V2 and V3 and each one of a separte signal sink of the circuit SR. At the same time, another signal conductor is connected between the ground of the circuit ST and a separate signal sink (transistor T4) of the circuit SR, a high ohmic resistor R being also included in this signal conductor.

The collector of transistor T4 is connected to the input of a current mirror CM1 and each collector of the transistors T1, T2 and T3 is connected to a separate output of the current mirror and to a separate signal current output C01, C02 or C03. The common terminal of the current mirror CM1 is connected to the positive terminal of the floating supply source. The current ratio between the input of the current mirror and each output is 1:1.

Sources producing a constant bias current are connected between the negative terminal of the supply source, which comprises the batteries B1 and B2, and the emitters of the transistors T1–T4. The transistors T1–T4 are then not cutoff unless the currents in the signal conductors connected to the emitters increase to above the bias current. This holds for one direction of the current in the signal conductors, which is here assumed to be positive. For the other current direction there is no definite limit value for the current other than the maximum value of the current which can be tolerated by the transistor, and this value can be determined by a suitable choice of the transistor.

The current flowing to a signal current output C01, C02 or C03 is the difference between the collector current of transistor T1, T2 or T3 and the collector current of transistor T4. This last-mentioned current is equal to the current having the value Ir which flows in the signal conductor connected to the emitter, less the bias current, when the base current is neglected.

The currents flowing in the signal conductors connected to the signal sources V1, V2 and V3 are denoted by I1+Ir, I2+Ir and I3+Ir respectively. For the currents I1, I2 and I3 it holds that:

V1=I1.R

V2=I2.R

V3=I3.R (1)

At the signal current outputs C01, C02 and C03 there are then produced the signal currents I1, I2 and I3, which are proportional to the signal voltages V1, V2 and V3, respectively, independent of the value of Ir.

The value of Ir may be influenced by the presence of a disturbing voltage between ground and the second voltage reference point RI. The presence of such a disturbing voltage having the value Vs is illustrated in FIG. 1 by the presence of an equivalent voltage source having the voltage value Vs in each one of the signal conductors, which connect the circuit ST to the circuit SR and in series relationship to impedance Z.

For the voltage Vri it holds that:

Vri=Vs+(V1+V2+V3).Y/(R+Y)

wherein:

Y=Z.R/3(Z+R/3) (2)

The current mirror CM1 has for its effect that the currents Ir flowing in the remaining signal conductor is subtracted from the currents I1+Ir, I2+Ir and I3+Ir which flow in the signal conductors connected to the signal sources V1, V2 and V3, the result being available at the signal current outputs C01, C02 and C03. The currents I1, I2 and I3 depend only on the respective signal voltages V1, V2 and V3, so that the current Ir is a real reference current for the currents flowing in the other signal conductors. The signal conductor which carries the current Ir will be denoted reference signal conductor hereinafter.

The voltage Vri of the second voltage reference point RI of circuit SR of FIG. 1 depends on the signal voltages V1, V2 and V3. This means that the circuit SR has a common-mode voltage with respect to ground of the circuit ST which is signal-dependent.

The signal-dependent common-mode voltage of circuit SR results from the fact that a net signal current flows from the circuit ST to the circuit SR through the signal conductors which are connected to the signal sources V1, V2 and V3.

Figure 2:
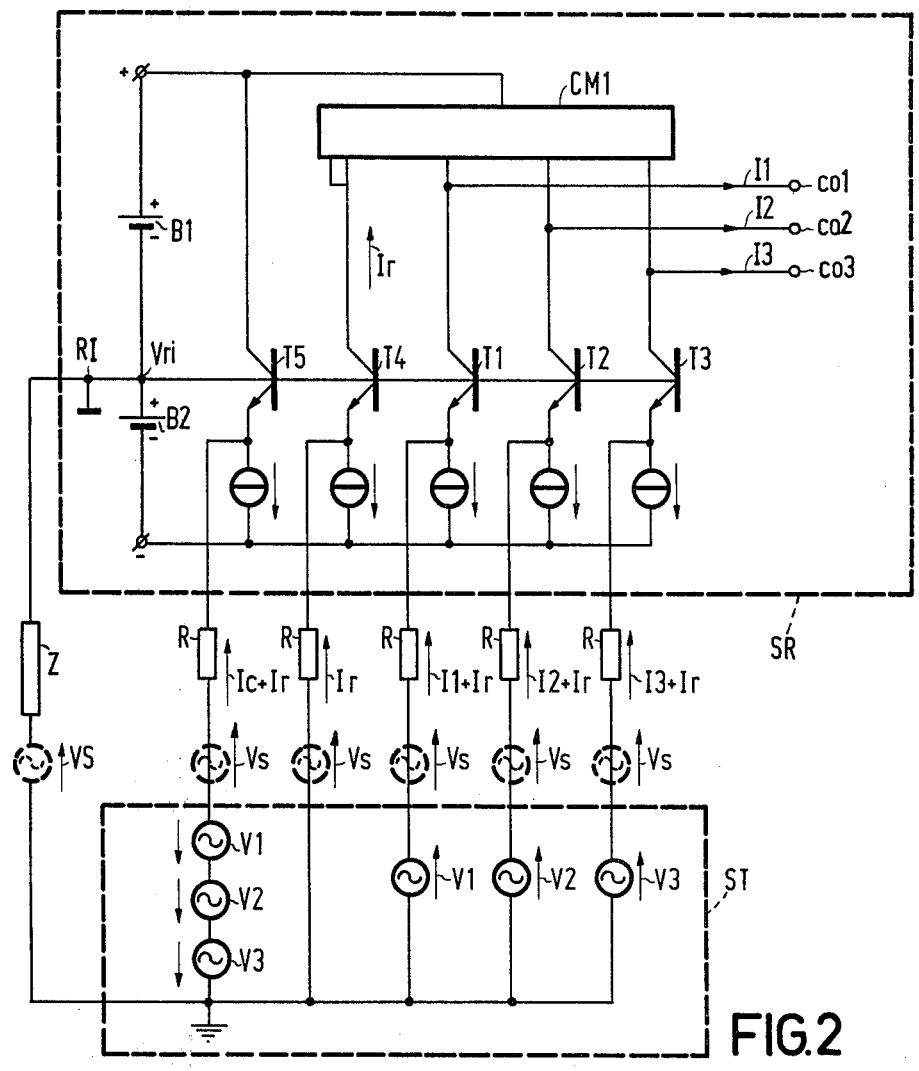
FIG. 2 shows a second example of an arrangement according to the invention, comprising a high ohmic compensation signal conductor.

The arrangement shown in FIG. 2 includes a compensation signal conductor which is controlled in circuit ST by a signal source comprising the series arrangement of three signal sources producing signal voltages of the values V1, V2 and V3, respectively, which are equal to the values of the separate signal sources V1, V2 and V3. The polarity of each signal voltage from a signal source in the series arrangement is opposite to the polarity of the signal voltage of the separate signal source.

The compensation signal conductor also includes high ohmic resistor R. This signal conductor terminates in circuit SR in a separate signal sink, which is formed by the emitter-base junction of the transistor T5.

A current having the value Ic+Ir, wherein Ic=−(I1+I2+I3) flows through the compensation signal conductor, which results in that no net signal current flows through the combination of the signal conductors connected to separate signal sources V1, V2 and V3 and the compensation signal conductor. The voltage Vri of the second voltage reference point RI is then independent of the signal voltages.

The arrangements shown in the FIGS. 1 and 2 provide signal current outputs C01, C02 and C03, which produce the signal currents I1, I2 and I3, which are proportional to the signal voltages V1, V2 and V3.

Figure 3:
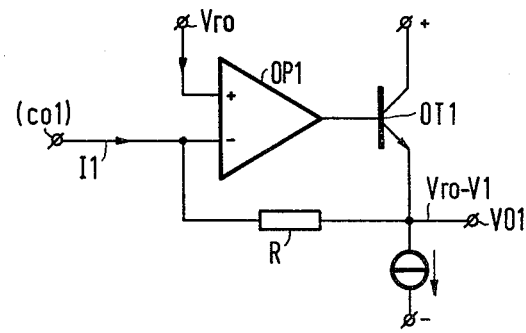
FIG. 3 shows a current-voltage converter for use in the arrangement of FIG. 2.

A signal current output can be converted in a simple way into a signal voltage output using the current-voltage converter of FIG. 3. This converter converts, for example, signal current output C01 into a signal voltage output V01, using an operational amplifier OP1 and an output transistor OT1 and a feedback from the signal voltage output to the inverting input of the operational amplifier through a resistor having a resistance value R. The output voltage is then Vro−I1.R=Vro−V1, wherein Vro represents the value of a reference voltage applied to the non-inverting inputs of the operational amplifier and use being made of the relation (1). A constant bias current source, which is not specified is connected to the output. This bias current does not influence the output voltage and is only used to set the operating range of transistor OT1.

Figure 4:
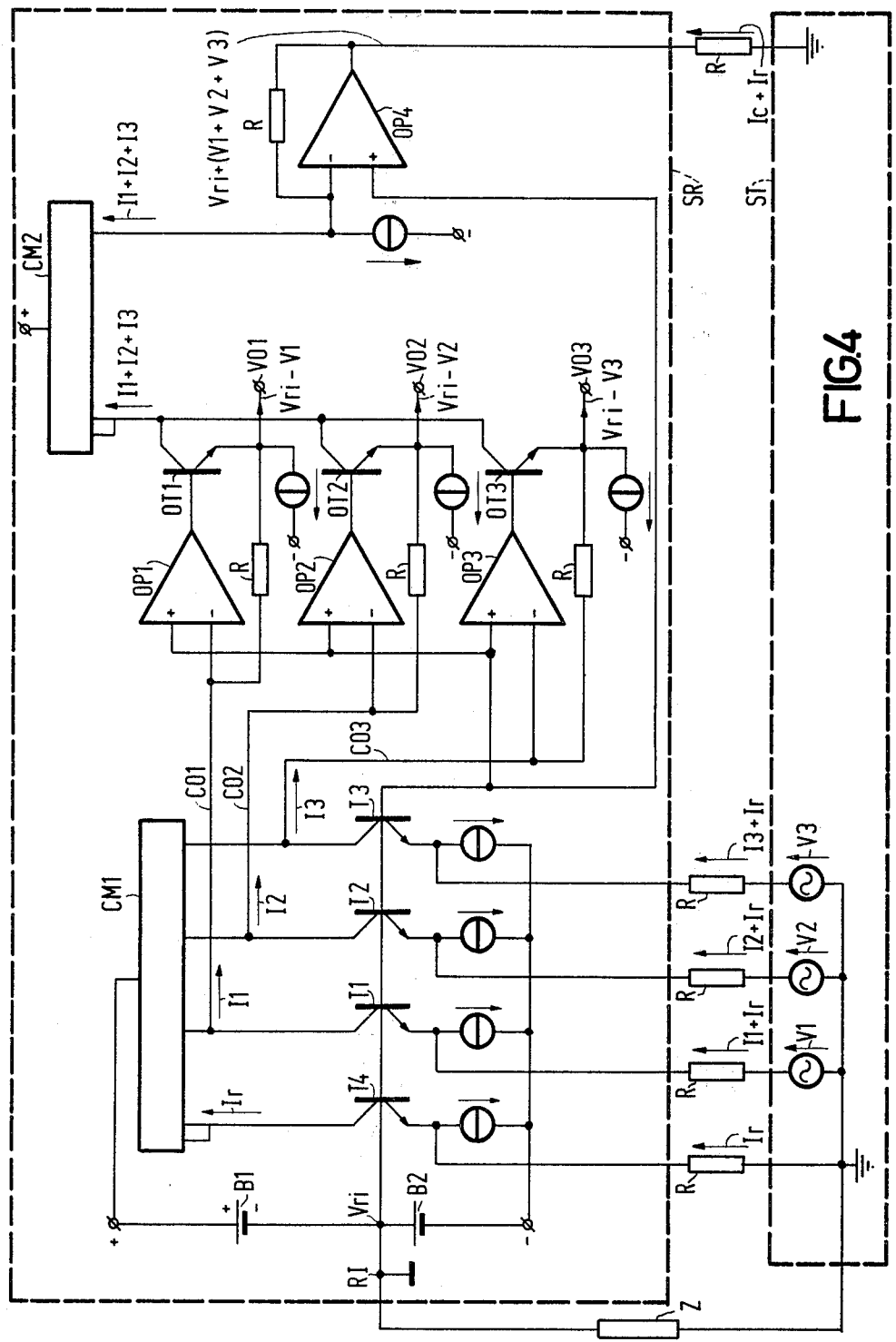
FIG. 4 shows a third example of an arrangement according to the invention comprising a high ohmic compensation signal conductor and a control therefor in the signal-receiving second circuit arrangement.

An extended version of the circuit arrangement of FIG. 1 with current-voltage converters of the type shown in FIG. 3 for converting the signal current outputs C01, C02 and C03 into the signal voltage outputs V01, V02 and V03 is shown in FIG. 4. The reference voltage applied to the operational amplifiers OP1, OP2 and OP3 is in this case the voltage Vri of the second voltage reference point RI.

The collectors of the transistors OT1, OT2 and OT3 are interconnected and connected to the input of a current mirror CM2. A current-voltage converter comprising an operational amplifier OP4 and a feedback resistor having the resistance value R is connected to the current mirror output. The reference voltage for the current-voltage converter is formed by the voltage Vri.

The signal current component of the input current of current mirror CM2 has a value I1+I3+I3 and the current ratio between the input and the output is 1:1. A non specified constant bias current source, is connected to the output of current mirror CM2, this source being capable of receiving the bias current component of the current mirror output current. The output voltage of the operational amplifier OP4 is then:

Vri+(V1+V2+V3).

The output of the operational amplifier OP4 is connected to a compensation signal conductor, which includes a high ohmic resistor R and the other end of which is connected to the ground of the circuit ST. The signal current Ic=−(I1+I2+I3) which in response thereto starts flowing through the compensation signal conductor balances the sum of the signal currents flowing through the signal conductors connected to the separate signal sources V1, V2 and V3 of circuit ST.

No net signal current flows through the signal conductors to which the separate signal sources V1, V2 and V3 are connected and through the compensation signal conductor, so that the voltage Vri of the second voltage reference point RI is independent of the signal voltages, as also applies to the arrangement shown in FIG. 2. It should be noted that in the arrangements of FIG. 2 and FIG. 4 the current Ir is independent of the signal voltages V1, V2 and V3 and that Ir=o when Vs=o.

Figure 5:
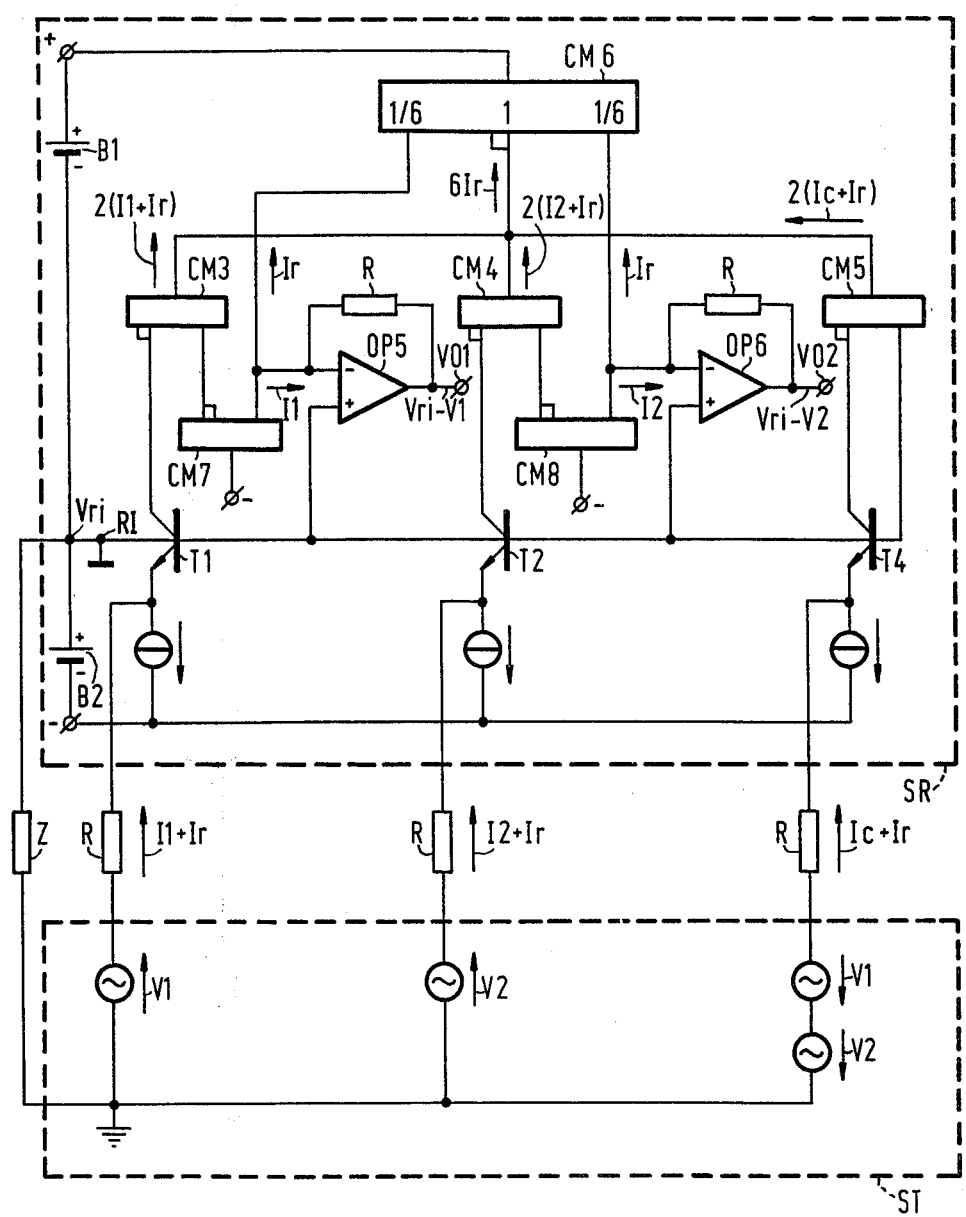
FIG. 5 shows a fourth example of an arrangement according to the invention, having a balanced signal transmission without a separate high ohmic compensation signal conductor.

The functions of the reference signal conductor and the compensation signal conductor can be combined in a manner illustrated in FIG. 5. Only for simplicity of the illustration, the number of signal sources in this Figure has been reduced to two.

In the circuit ST a signal source comprising a series arrangement of signal sources having the voltage values V1 and V2 is connected to the reference signal conductor and this signal source causes a current having the value Ic+Ir to flow in the reference signal conductor. The currents I1+Ir and I2+Ir, wherein (I1+I2)=−Ic, flow through the other signal conductors. The reference current Ir must be determined in the circuit SR in order to enable determination of the signal current components I1=V1/R and I2=V2/R of the currents I1+Ir and I2+Ir.

The collectors of the transistors T1, T2 and T4 are connected to the inputs of the current mirrors CM3, CM4 and CM5. The common terminals of these current mirrors are interconnected and connected to the input of a current mirror CM6.

The current ratio between the input and output of each current mirror CM4, CM3 and CM5 is 1:1. The values of the currents flowing through the common terminals of these current mirrors are then 2(I1+Ir), 2(I2+Ir) and 2(Ic+Ir), respectively. (Herein and in the following description the contributions of any constant bias currents to these current values have been neglected). The sum of these currents is applied to the input of the current mirror CM6. The input current of the current mirror CM6 has the value 6Ir, as the currents having the values 2I1, 2I2 and 2Ic cancel each other.

Current mirror CM6 has two outputs and the current ratio between the input and each output is 6:1, so that the outputs carry the currents having the value Ir.

The output of current mirror CM3 is connected to the input of current mirror CM7 and the output thereof is connected together with an output of current mirror CM6 to the input of a current-voltage converter. Said last converter comprises an operational amplifier OP5 and a feedback resistor having resistance value R. The reference voltage Vri is applied to the non-inverting input of the operational amplifier OP5. The input current of the current-voltage converter is the difference between the output current from current mirror CM7 and the output current from an output of current mirror CM6 and has as a result thereof the value I1. The output voltage of the operational amplifier OP5 has then the value Vri−V1.

In like manner, an output voltage having the value Vri−V2 is generated by means of a current mirror CM8, the second output of current mirror CM6, the operational amplifier OP6 and a feedback resistor having the resistance value R.

The use of a compensation-signal conductor carrying a current which balances the sum of the signal currents I1, I2 etc. makes the voltage Vri of the voltage reference point RI of the circuit SR independent of the signal voltages.

Figure 6:
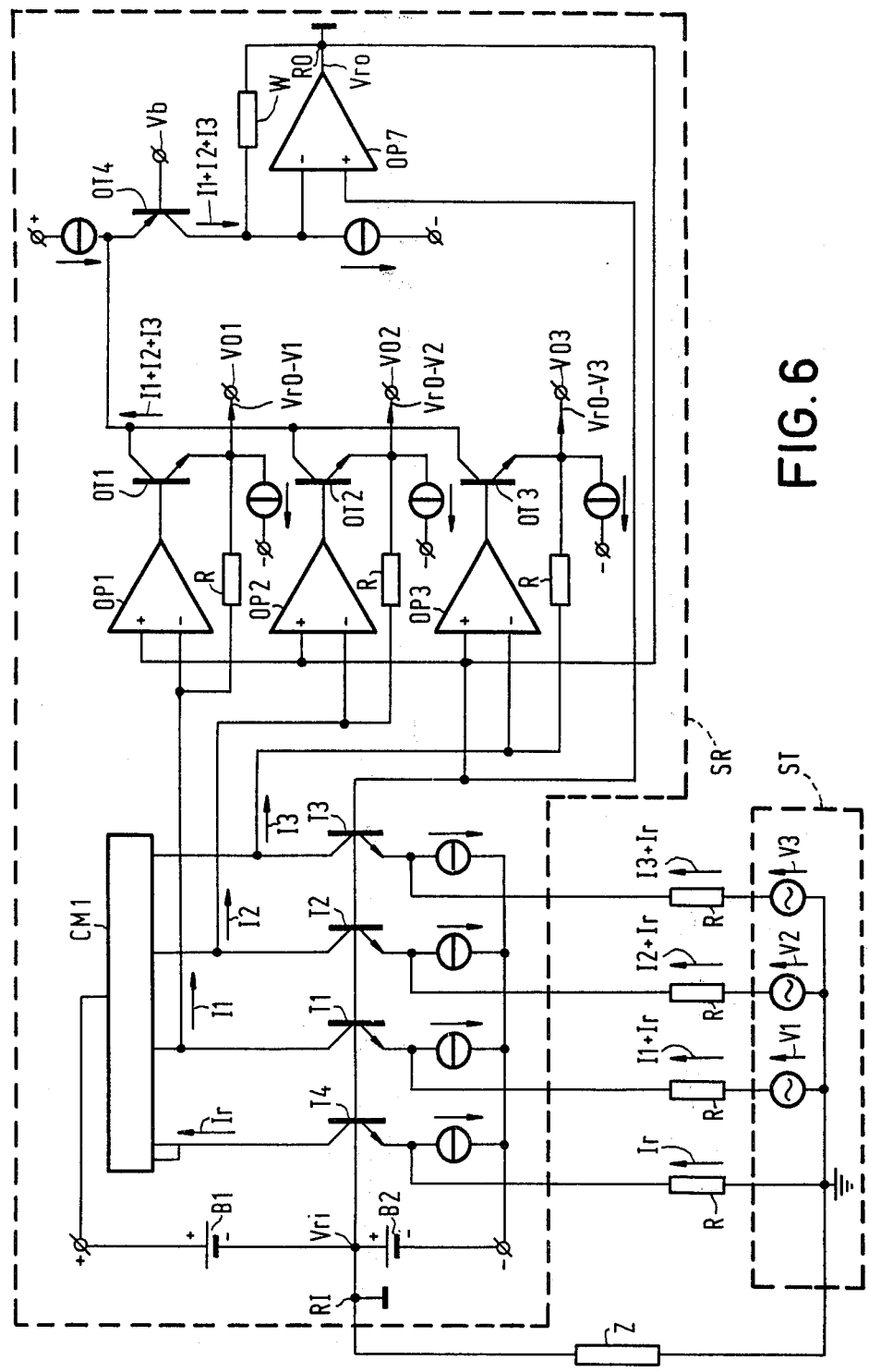
FIG. 6 shows a fifth example of an arrangement according to the invention, having a signal-independent third voltage reference point in the signal-receiving second circuit arrangement.

In circuit SR, a signal-independent voltage reference point RO having the voltage Vro can be realised by adding a voltage which cancels the signal-dependent portion of the voltage Vri to the signal-dependent voltage Vri. FIG. 6 illustrates a method to realise this.

For simplicity of the description it should be noted that, seen into the signal direction, up to the signal voltage outputs V01, V02 and V03 FIG. 6 is substantially identical to FIG. 4, the only difference being that in FIG. 6 the reference voltage of the operational amplifiers OP1, OP2 and OP3 is the voltage Vro.

The collectors of the transistors OT1, OT2 and OT3 are connected to the emitter of a transistor OT4. A non specified constant bias current source is connected to this emitter and a suitable bias voltage Vb is applied to the base of transistor OT4. The collector of transistor OT4 is connected to the input of a current-voltage converter comprising an operational amplifier OP7 and a feedback impedance having an impedance value W. W is the impedance value of the parallel arrangement of the signal conductors and the impedance Z:

$$W = Z \cdot R/4(Z+R/4) \tag{3}$$

A non-specified constant bias current source, is connected to the inverting input of the operational amplifier OP7, this source being capable of receiving the bias current component of the collector current of transistor OT4. The non-inverting input of the operational amplifier OP7 is connected to the voltage reference point RI.

Neglecting the contributions of the bias currents, the sum of the collector currents of the transistors OT1, OT2 and OT3 has the value (I1+I2+I3) and this is likewise the value of the input current of the current-voltage converter comprising the operational amplifier OP7. For the output voltage Vro thereof it holds that:

$$Vro = Vri - (I1+I2+I3) \cdot W \tag{4}$$

Using the expressions (1), (2), (3) and (4), it can be demonstrated that Vro is independent of the signal voltages V1, V2 and V3.

The output of the operational amplifier OP7 forms the signal-independent voltage reference point RO and this output is connected to the non-inverting inputs of the operational amplifiers OP1, OP2 and OP3, in order to supply them with the signal-independent reference voltage Vro.

The impedance W depends on the impedance Z, so that the method illustrated in FIG. 6 can only be used when the impedance value Z is known or when Z is much higher than R, in which case the expression (3) changes into $W = R/4$.

Figure 7:
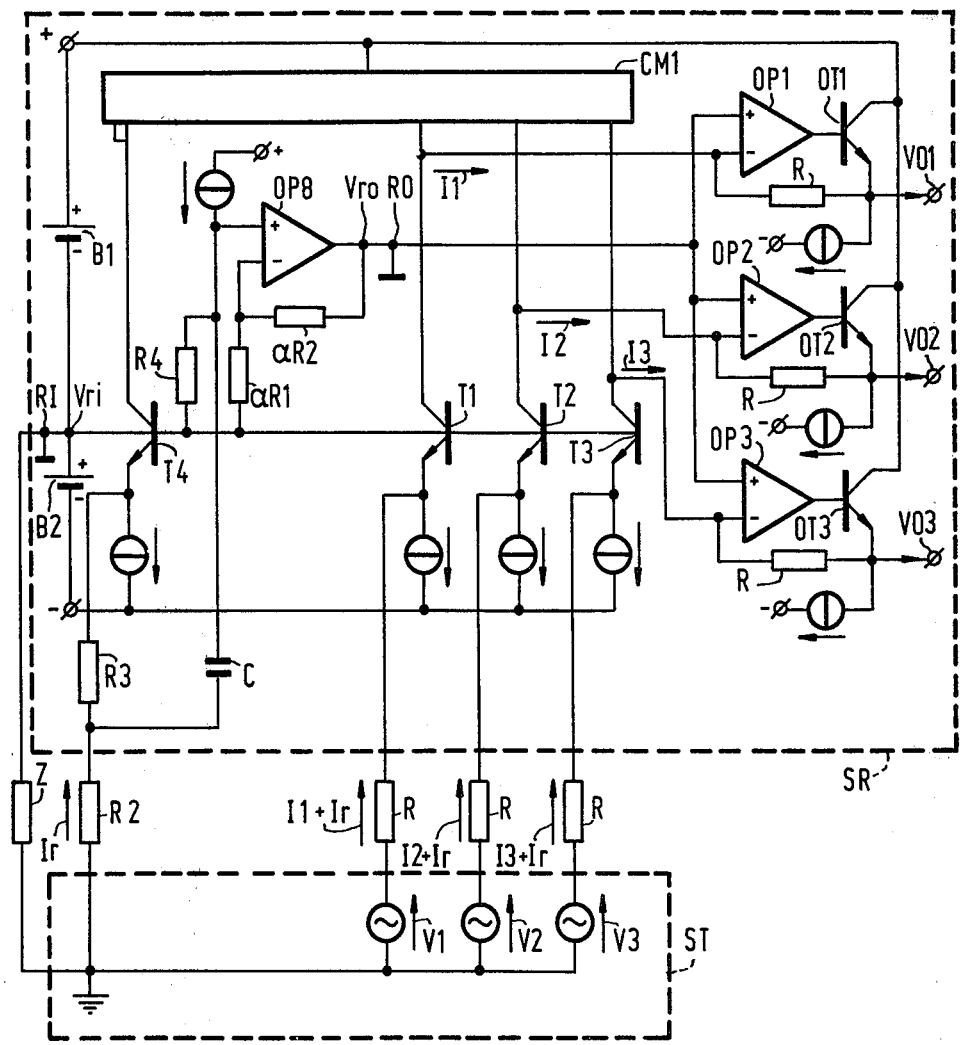
FIG. 7 shows a sixth example of an arrangement according to the invention, having a signal-independent third voltage reference point realised in an alternative way.

An alternative method of realising a signal-independent voltage reference point RO, independent of the impedance Z, is illustrated in FIG. 7.

For simplicity of the description, it should be noted that, seen into the signal direction, FIG. 7 is similar to FIG. 6 up to the signal voltage outputs V01, V02 and V03.

The resistor included in the reference signal conductor has a tap. The portion of the resistor between the tap and ground of circuit ST has the value R2, and the portion between the tap and the emitter of transistor T4 has the value R3. This tap is connected through a capacitor C which has a low impedance value for signal currents to the input of a voltage comparator comprising an operational amplifier OP8 the output of which is fed back to its inverting input through a resistor having the resistance value αR2. The inverting input of the operational amplifier OP8 is connected to the voltage reference point RI through a resistor having the resistance value αR1.

The non-inverting input of the operational amplifier OP8 is connected to the voltage reference voltage point RI through a resistor having a resistance value R4. A non specified constant bias current source is connected to the non-inverting input.

The resistance values R, R1, R2, R3 and R4 are defined by the equations:

$$R1 = R3 \cdot R4/(R3+R4) \tag{5}$$

$$R = R1+R2 \tag{6}$$

The reference signal conductor then has the same effective resistance for signal currents as the other signal conductors.

The inverting input of the operational amplifier OP8 will receive from the voltage reference point RI a voltage having a value as defined by the expression:

$$Vri \cdot \alpha R2/(\alpha R1 + \alpha R2) = Vri \cdot R2/R \tag{7}$$

The non-inverting input of the operational amplifier OP8 receives from the reference signal conductor a voltage having a value defined by the expression $$-Ir \cdot R2 = Vri \cdot R2/R \tag{8}$$

Comparing the expressions (7) and (8) shows that there is no voltage difference between the two inputs of the operational amplifier OP8. The output thereof may then be used as the signal-independent voltage reference point RO.

The voltage of the voltage reference point RO can be adjusted to the desired DC value by adjusting the value of the bias current supplied by the constant bias current source connected to the non-inverting input.

It should be noted that a portion of the current flowing through the reference signal conductor is tapped by capacitor C and does not reach the emitter of transistor T4. In order to obtain a proper operation of circuit SR despite the current flowing through the capacitor the current ratio of current mirror CM1 can be adapted to compensate for the loss in current of transistor T4.

Each signal conductor may be used to transmit a signal from the circuit ST to the circuit SR and for transmitting a signal from the circuit SR to the circuit ST, for the case where signals are to be exchanged in two directions between the circuits.

Figure 8:
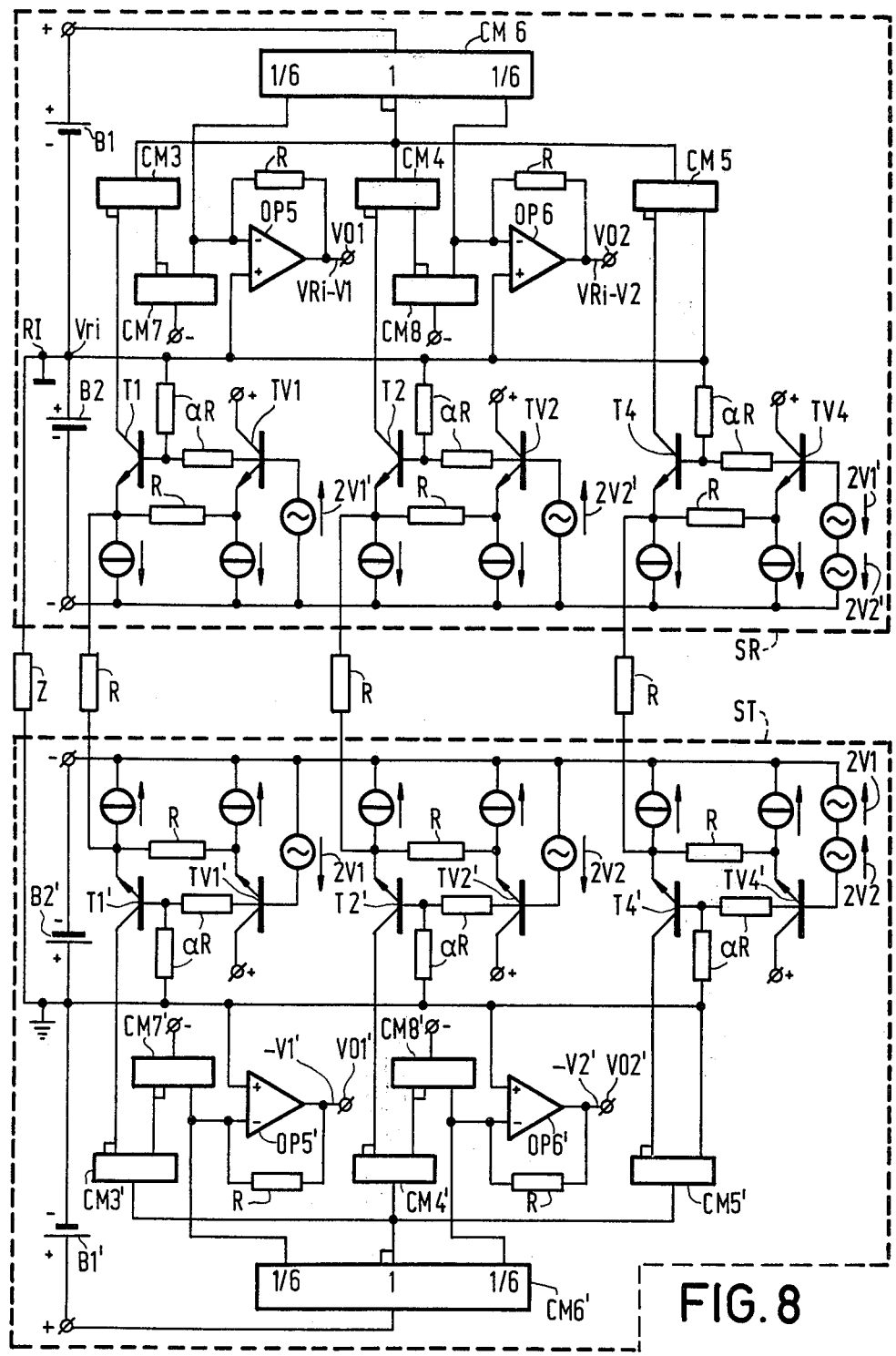
FIG. 8 shows a seventh example of an arrangement according to the invention in which signals are transmitted into two signal directions.

A method of realising duplex transmission is illustrated in FIG. 8. For simplicity of the description it is to be noted that in this case the lower portion of FIG. 8, which illustrates circuit ST, is the mirror image of the upper portion of FIG. 8, which illustrates the circuit SR. The corresponding components in the lower portion of FIG. 8 are referenced in the same way as in the upper portion of FIG. 8, these references having been provided with an accent notation for the sake of distinction. It should further be noted that, seen into the signal direction, the upper portion of FIG. 8 from the collectors of the transistors T1, T2 and T4 onwards is identical to FIG. 5.

The circuit SR comprises the separate signal sources having the signal voltages of the values 2V1' and 2V2' for the transmission of signals to the circuit ST. The circuit ST comprises the separate signal sources having the signal voltages of the values 2V1 and 2V2 for the transmission of signals to the circuit SR.

The circuit SR further comprises a compensation signal source comprising a series arrangement of two signal sources having the voltage values 2V1' and 2V2'. The circuit ST further comprises a compensation signal source comprising a series arrangement of two signal sources having the voltage values 2V1 and 2V2.

The separate signal source 2V1' is connected to the four-wire input of a hybrid circuit comprising the transistors TV1 and T1, the four-wire output of which is formed by the collector of transistor T1. The four-wire input of the hybrid is formed by the base of transistor TV1. The emitter of transistor TV1 is connected through a resistor having resistance value R to the signal conductor which is connected to the emitter of transistor T1. This resistor functions as the balancing impedance of the hybrid. Half the signal voltage 2V1', namely the voltage V1', is applied across the balancing resistor and the other half, namely voltage V1', is applied to the end of the signal conductor.

The four-wire input of the hybrid is further connected to the base of transistor T1 through a voltage divider consisting of two resistors having a resistance value αR. As a result thereof this base received half the signal voltage, namely the voltage V1', which balances the voltage V1' of the emitter of transistor T1. The result is that no current which results from the signal voltage 2V1' can flow into the four-wire output of the hybrid.

The separate signal source 2V2' and the compensation signal source 2V1'+2V2' are connected to similar hybrids to those described above. The hybrid comprising the transistors T2 and TV2 applies the signal voltage V2' to the signal conductor which is connected to the emitter of transistor T2. The hybrid comprising the transistors T4 and TV4 applies the compensation signal voltage −(V1'+V2') to the signal conductor which is connected to the emitter of transistor T4.

In the circuit ST, shown in the lower portion of FIG. 8, the signal voltages V1, V2 and −(V1+V2) are applied to the signal conductors by similar hybrids.

The emitter-base junctions of the transistors T1, T2 and T4 function as signal sinks for the signals which are transmitted from the circuit ST to the circuit SR. The output signal voltages Vri−V1 and Vri−V2 at the outputs V01 and V02 are derived from these signals in a manner which has already been described in detail with reference to FIG. 5.

The emitter-base junctions of the transistors T1', T2' and T4' function as signal sinks for the signals which are transmitted from the circuit SR to circuit ST. In the circuit ST the output signal voltages −V1' and −V2' at the outputs V01' and V02' are derived from these signals in the same way as described above for the corresponding signal voltages of the circuit SR. The ground (zero volt) of the circuit ST functions here as a voltage reference point for the outputs V01' and V02'.

What is claimed is:

1. An arrangement for transmitting signals from a first circuit arrangement comprising a first voltage reference point and a plurality of signal sources each having one side connected to the first voltage reference point to a second circuit arrangement comprising a second voltage reference point and a plurality of signal sinks each having one side connected to the second voltage reference point, the two voltage reference points being separated by an impedance having an impedance value different from zero it being possible that a disturbing voltage is present between the said voltage reference points, characterized in that for the transmission of each one of the signals of the plurality of signal sources from the first to the second circuit arrangement one separate signal conductor which includes an impedance having a high impedance value, denoted high ohmic signal conductor, is provided between the relevant signal source of the first circuit arrangement and a separate signal sink of the second circuit arrangement, in that at least two of these high ohmic signal conductors are provided for the transmission of at least two independent signals and that a signal conductor which includes an impedance having a high impedance value, denoted high ohmic reference-signal conductor is provided between the first voltage reference point of the first circuit arrangement and a separate signal sink of the second circuit arrangement and that the second circuit arrangement includes means for linearly combining the currents flowing in the high ohmic signal conductors and the high ohmic reference-signal conductor for generating signal currents in the second circuit arrangement which are proportional to the signals transmitted by the first circuit arrangement to the second circuit arrangement and are substantially independent of the disturbing voltage which may be present between the voltage reference points of the two circuit arrangements.

2. An arrangement as claimed in claim 1, characterized in that a compensation signal source is provided having a signal voltage corresponding to that of a series arrangement of the said plurality of signal sources and that the compensation signal source is connected in series with a signal conductor including an impedance having a high impedance value, denoted high ohmic compensation signal conductor, and with the emitter-base junction of a transistor, said base being connected to said second voltage reference point, and said compensation signal source being connected to said first voltage reference point, the polarity of the signal voltages in the said series arrangement being determined such that the total signal current flowing through the signal conductors connected to said plurality of signal sources is balanced by a compensation signal current flowing in the compensation signal conductor which is of equal magnitude and opposite polarity.

3. An arrangement as claimed in claim 1, characterized in that the second circuit arrangement comprises adder means for forming an output current which is proportional to the sum of the signal currents which are proportional to the signals transmitted by the first circuit arrangement to the second circuit arrangement and impedance means for providing a compensation voltage in response to the output current of the adder means and means for adding the compensation voltage to the voltage of the second voltage reference point for forming a signal-independent third voltage reference point at the output of said last-mentioned means.

4. Arrangement as claimed in claim 1, characterized in that the impedance included in the high ohmic reference signal conductor has a tap, in that the second circuit arrangement comprises a voltage comparator for forming at the output of the voltage comparator a signal-independent voltage reference point in response to the voltage at the said tap and a voltage which is proportional to to the voltage of the second voltage reference point.

5. An arrangement as claimed in claim 1 for exchanging signals between the two circuit arrangements in two signal directions, each circuit arrangement comprising a plurality of signal sources and a plurality of signal sinks, characterized in that a signal source of one of said two circuit arrangements is connected by a hybrid, which includes in combination with an input transistor a signal sink, to one end of a high ohmic signal conductor, the other end of said high ohmic signal conductor being connected to a signal sink in the other of said two circuit arrangements, further characterized in that a signal source of said other of said two circuit arrangements is connected in a like manner to the said signal sink in said one of said two circuit arrangements.

* * * * *